(12) United States Patent
Paanajarvi et al.

(10) Patent No.: US 10,217,401 B2
(45) Date of Patent: Feb. 26, 2019

(54) DISPLAYING CONTENT ON A DISPLAY IN POWER SAVE MODE

(71) Applicant: Microsoft Technology Licensing, LLC, Redmond, WA (US)

(72) Inventors: Jussi Paanajarvi, Helsinki (FI); Pedro DeRose, Redmond, WA (US); Adrian Collier, Bellevue, WA (US); Mikko Kankainen, Helsinki (FI)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/515,580

(22) PCT Filed: Sep. 30, 2015

(86) PCT No.: PCT/US2015/053059
§ 371 (c)(1),
(2) Date: Mar. 29, 2017

(87) PCT Pub. No.: WO2016/054122
PCT Pub. Date: Apr. 7, 2016

(65) Prior Publication Data
US 2017/0301281 A1 Oct. 19, 2017

Related U.S. Application Data

(60) Provisional application No. 62/057,604, filed on Sep. 30, 2014.

(51) Int. Cl.
*G06F 3/0484* (2013.01)
*G09G 3/20* (2006.01)
*G09G 5/10* (2006.01)

(52) U.S. Cl.
CPC ............. *G09G 3/2096* (2013.01); *G09G 3/20* (2013.01); *G09G 5/10* (2013.01); *G06F 3/04842* (2013.01);
(Continued)

(58) Field of Classification Search
CPC .................................................. G09G 2330/02
See application file for complete search history.

(56) References Cited

U.S. PATENT DOCUMENTS

2006/0101293 A1* 5/2006 Chandley .............. G06F 1/3203
713/300
2009/0307619 A1* 12/2009 Gupta .................... H04L 67/36
715/764
(Continued)

FOREIGN PATENT DOCUMENTS

WO 2013183239 A1 12/2013

OTHER PUBLICATIONS

ISA European Patent Office, International Search Report and Written Opinion Issued in PCT Application No. PCT/US2015/053059, dated Jan. 25, 2016, WIPO, 12 pages.
(Continued)

*Primary Examiner* — Phong X Nguyen
(74) *Attorney, Agent, or Firm* — Alleman Hall Creasman & Tuttle LLP

(57) ABSTRACT

A mobile device display comprises a normal operating mode and a power save mode. The display comprises an area for use during power save mode operation of the mobile device. The area is a portion of a full display area or the full display area. The mobile device comprises a memory that comprises an application program. The mobile device displays a first content relating to the application program in the area. The content is displayed for a first determined time period or until the mobile device transitions from the power save
(Continued)

mode to the normal operating mode, when the mobile device is in the power save mode and the user controllable application program is running, the first determined time period is provided by the application program.

19 Claims, 5 Drawing Sheets

(52) U.S. Cl.
CPC ... *G09G 2310/04* (2013.01); *G09G 2330/021* (2013.01); *G09G 2330/022* (2013.01); *G09G 2354/00* (2013.01)

(56) References Cited

U.S. PATENT DOCUMENTS

| | | | |
|---|---|---|---|
| 2011/0022993 A1 | 1/2011 | Ohno et al. | |
| 2012/0150785 A1* | 6/2012 | Subramanya | G06F 9/485 706/46 |
| 2013/0082937 A1* | 4/2013 | Liu | G06F 1/3262 345/173 |
| 2013/0117591 A1* | 5/2013 | Enomoto | G06F 1/3231 713/320 |
| 2013/0219332 A1* | 8/2013 | Woley | G06F 1/3209 715/808 |
| 2013/0222323 A1* | 8/2013 | Mckenzie | G06F 1/169 345/174 |
| 2014/0120988 A1* | 5/2014 | Gunn | G06F 3/0488 455/566 |
| 2014/0191981 A1* | 7/2014 | Ramasarma | G06F 3/0481 345/173 |
| 2015/0156143 A1* | 6/2015 | Chopde | H04L 51/04 715/752 |
| 2015/0194124 A1 | 7/2015 | Yamauchi et al. | |
| 2015/0364073 A1* | 12/2015 | Ogawa | G06F 3/0485 345/690 |
| 2016/0062450 A1* | 3/2016 | Han | G06F 1/3265 715/778 |
| 2016/0147282 A1* | 5/2016 | Ogawa | G06F 1/3262 345/173 |
| 2017/0236497 A1* | 8/2017 | Huitema | G09G 5/393 345/173 |

OTHER PUBLICATIONS

IPEA European Patent Office, Second Written Opinion Issued in PCT Application No. PCT/US2015/053059, dated Jul. 15, 2016, WIPO, 9 pages.
IPEA European Patent Office, International Preliminary Report on Patentability Issued in PCT Application No. PCT/US2015/053059, dated Nov. 22, 2016, WIPO, 22 pages.
"Office Action Issued in European Patent Application No. 15787060. 1", dated Mar. 13, 2018, 8 Pages.
"Office Action Issued in European Patent Application No. 15787060. 1", dated Nov. 26, 2018, 8 Pages.

* cited by examiner

US 10,217,401 B2

DISPLAYING CONTENT ON A DISPLAY IN POWER SAVE MODE

CROSS REFERENCE TO RELATED APPLICATIONS

The present application is the U.S. National Phase of International Patent Application Serial No. PCT/US2015/053059, entitled "DISPLAYING CONTENT ON A DISPLAY IN POWER SAVE MODE", filed Sep. 30, 2015, which claims priority to U.S. Provisional Patent Application No. 62/057,604 entitled "DISPLAYING CONTENT ON A DISPLAY IN POWER SAVE MODE," filed Sep. 30, 2014, the entire contents of each of which are hereby incorporated by reference for all purposes.

BACKGROUND

The reducing of power consumption is an important factor in the design of mobile devices. The aim is to prolong the time between occasions when the recharging of battery of the mobile device is needed. In addition to the optimization of radio communication over the air interface, in particular transmissions by the mobile device, an important component that has a significant effect on power consumption is the display. Modern smart phones are equipped with large displays. In order to save battery the display is switched off when a user of the mobile device is not actively using the device. Another benefit of switching the display off is the prevention of image burn-in.

Mobile devices are equipped increasingly often with accelerometers, magnetometers and satellite navigation receivers that enable a plethora of navigation and positioning services. A magnetometer together with an accelerometer enables the implementation of digital compass applications in mobile devices. Accelerometers enable, for example, the implementation of pedometer applications in mobile devices. Therefore, together with navigation and positioning applications accelerometers enable the implementation of a variety of sports applications. These applications may display information on the distance walked by the user together with the path walked. The information regarding the current position of the user may be indicated, for example, on a map displayed on the screen. The information may be constantly updated so that the user may follow his/her position and distance travelled on the mobile phone display. The user may unlock the mobile device by pressing a key and check the current information on the display.

The embodiments described below are not limited to implementations which solve any or all of the disadvantages of known mobile devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A mobile device display comprises a normal operating mode and a power save mode. The mobile device comprises a memory that comprises an application program. The mobile device displays a first content relating to the application program on the display when the display is in the power save mode. The content is displayed for a first determined time period or until the mobile device transitions from the power save mode to the normal operating mode, when the mobile device is in the power save mode and the application program is running. The first determined time period is specified by the first application program.

The application program may also be called a user executable application program in the sense that the application program may be started by the user separately and independently of the operating system of the mobile device. The information displayed by the application program is distinct from, for example, the time and date information that mobile devices typically display while in power save mode automatically and without user interaction.

Many of the attendant features will be more readily appreciated as they become better understood by reference to the following detailed description which is considered in connection with the accompanying drawings.

BRIEF DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples are described and illustrated herein as being implemented in a mobile device, the device described is provided as an example and not a limitation. As those skilled in the art will appreciate, the present examples are suitable for application in a variety of different types of mobile and/or hand-held apparatuses, e.g. in tablets, laptops, audio players, video players, personal digital assistants and wearable computers comprising at least one display.

Figure 1:
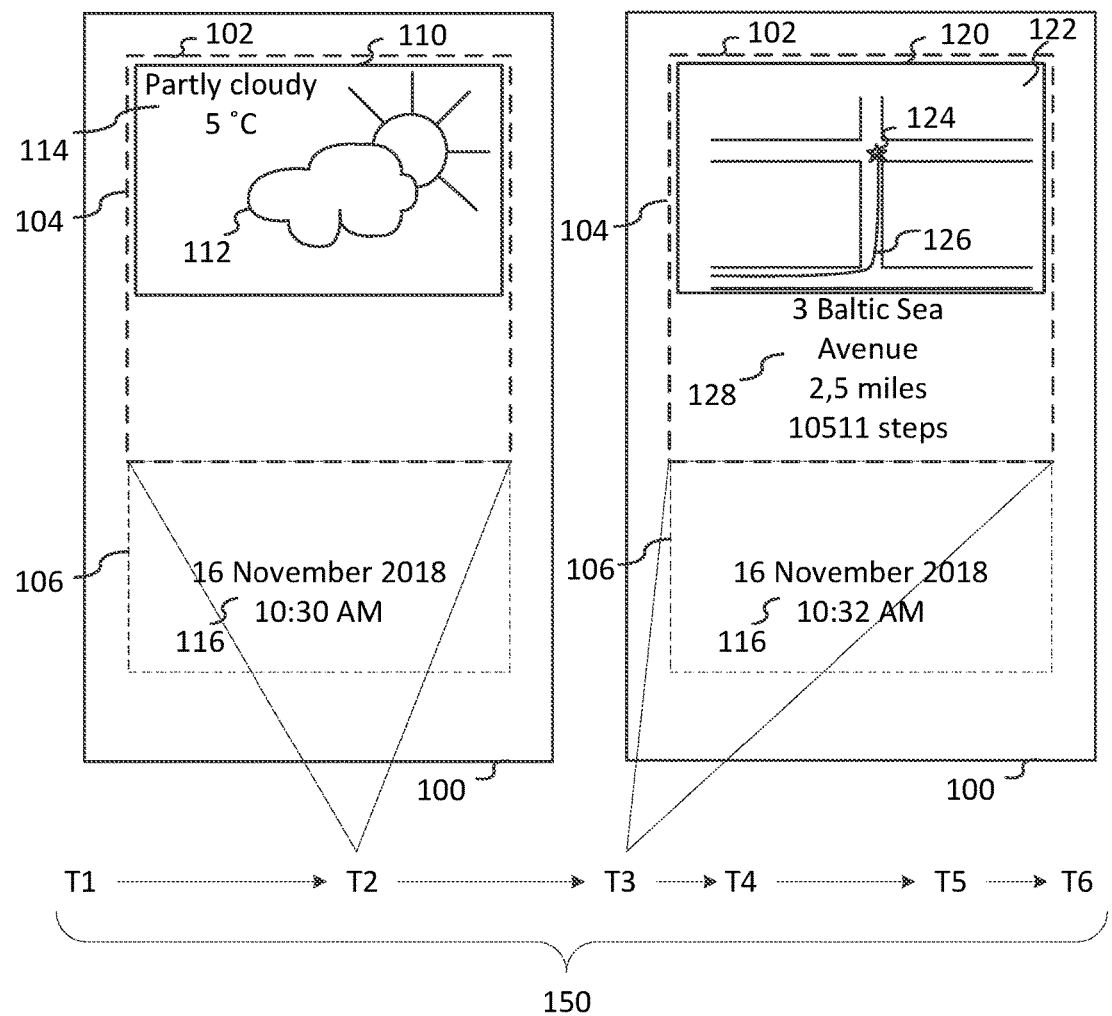
FIG. 1 illustrates two examples of contents presented in a power save mode display within a display of a mobile device together with an example of a timeline diagram for the displaying of the messages in an embodiment.

FIG. 1 illustrates two examples of contents presented in a power save mode display 102 within a display 100 of a mobile device (not shown) together with an example of a timeline 150 diagram illustrating the displaying of the contents at different moments in time, in an embodiment. In an embodiment, the mobile device may be in a power save mode for the duration of the whole timeline.

Power save mode display 102 may comprise an application area 104 and a system area 106. System area 106 may be used by the operating system of the mobile device to display current time and/or date based on information from a clock unit of the mobile device and date information stored to a memory of the mobile device. The application area 104 may be used by an application program, which may be selected by the user. The selection may be performed using an application manager (not shown) of the operation system of the mobile device. The application area 104 may also be used by a second application program.

In an embodiment, the power save mode display comprises the entire display of the mobile device. In the power save mode, the background light of the display may be dimmer than in the normal operating mode. This may mean that at least one light source of the background light may emit light at a lower luminous intensity in the power save mode of the display than in the normal operating mode of the display.

A user controllable application may comprise an application to which the user may produce content or in which the user may contribute to the content provided by the application. The contribution may be, for example, in the form of user performed actions that the application registers or records. The recording may be performed by sensors of the mobile device or by a plurality of external sensors or application servers that the mobile device is in communication with.

Timeline 150 comprises separate events T1, T2, T3, T4, T5 and T6 at different moments in time regarding operation of the mobile device. The events are described herein. The mobile device has display 100, the entire area of which is used in a normal mode of the mobile device. The normal mode is in contrast with a power save mode in which only power save mode display 102, which is an area of display 100, is used to display information to the user.

The starting point in FIG. 1 is that operating system executes at least a first application program (not shown). The first application program may be a user controllable application program. The first application program may have been selected by the user of the mobile device as a primary content producer, which may display content in the power save mode display 102, for example, in the application area 104. The operating system may execute a second application program (not shown). The second application program may also be a user controllable application program. The second application program may have been selected by the user of the mobile device as a second content producer, which may display content in the power save mode display 102, for example, in application area 104. The second content producer has priority over the first content producer in displaying content in application area 104. If there is content to be displayed from the second content producer, it overrides the content from the first content producer. This means that content from the second content producer is displayed instead of content from the primary content producer always when there is content from the secondary content producer, assuming that the mobile device is in the power save mode.

The application program may be executed as an application process or a thread executed in the operating system. The mobile device is initially in the normal operating mode. In an embodiment, the mobile device is already in the power save mode.

At time T1 the first application program (not shown) executing in the operating of system of the mobile device may form a first content based on data gathered in the application from a variety of information sources. Examples of such information sources are servers, from which information is obtained to the mobile device through broadcasting, multicasting or unicasting. Unicasting may be achieved by the mobile device so that the mobile device transmits periodic or unscheduled request messages to a server, or request messages transmitted to the server in response to a user command detected via the user interface of the mobile device. The request messages may also be transmitted in response to an external stimulus, for example, a receiving of an indication message from the server indicating presence of new information for the mobile device.

The server responds to the request message with a response message to the mobile device. The response message may comprise information which may be used by the first application program to form the first content. The first content may comprise graphics obtained from the server and/or text obtained from the server or formed by the first application.

Further examples of such information sources comprise temperature sensors in association with the mobile device which allow a current temperature to be presented, at least one accelerometer in association with the mobile device that indicate current acceleration in the three dimensions, a pedometer application executing in the mobile device and utilizing information provided by the at least one accelerometer of the mobile device, at least one Global Navigation Satellite System (GNSS) receiver of the mobile device, a clock of the mobile device, a camera of the mobile device, a magnetic map navigation application utilizing at least one magnetometer in association with the mobile device and/or a digital compass in association with the mobile device, a map server providing map information messages to the mobile device based on geographic coordinate information obtained using the GNSS receiver or the magnetic navigation application and provided to the map server in a map information request message.

Even further examples of such information sources comprise Radio Frequency Identification tags or Near-Field Communication (NFC) tag read by the mobile device using an RFID tag reader or an NFC tag reader, respectively, in association with the mobile device.

While the mobile device is in the power save mode, the mobile device may periodically, for example, once in a predefined number of seconds or minutes temporarily transition to the normal mode in order to gather information for the first application program from information sources that require normal mode operation of the mobile device, for example, in order to be able to transmit and receive application data over the radio interface. The application data may be received over a radio resource, for example, a channel allocated for the mobile device. After the gathering of the information, the mobile device transitions back to the power save mode. During such a temporary transition, the display of the mobile device may still remain in the power save mode.

At time T1, the first application program may request a displaying of the first content in application area 104 of power save mode display 102 from the operating system of the mobile device. The request may comprise a first display period for presenting the first content during the power save mode. The duration of the first display period may range from 30 seconds to 20 minutes. The duration of the first display period may vary depending on the first application program. This means that the duration of the first display period may be defined by the user via a user interface of the first application program. The user interface of the first application program is part of the user interface of the mobile device. The duration of the first display period may be defined as a constant in the program code of the first application program. The message is not displayed immediately by the mobile device, if the mobile device is not yet in the power save mode. The operating system stores the message in a memory of the mobile device. The displaying of the first content in the power save mode display 102 is delayed until the mobile device transitions to the power save mode. In an embodiment, the mobile device is already in the power save mode at the time of requesting the displaying of the first content.

At time T2 mobile device transitions from the normal mode to the power save mode. The transition may be in response to determining that the user of the mobile device has not operated the user interface of mobile device within a predefined time period. The operation of the user interface may comprise pressing of at least one key in an embodiment where the mobile device comprises a keyboard, keypad or at least one control button, or the mobile device is communicatively connected to an external keyboard. The external keyboard may be a wearable keyboard which may be flexible or rolled. The operation of the user interface may comprise a touching of display 100 in an embodiment where the display is a touch sensitive display. The operation of the user interface may also comprise a recognizable visual gesture detected by a camera (not shown) in an embodiment where the mobile device is operated with visual gestures of, for example, of a hand or of the face of the user. The camera (not shown) may be mounted on the same side of the mobile device as display 100. The operation of the user interface may also comprise a voice command in an embodiment where the mobile device is operated with voice commands. The transitioning may also be explicitly requested by the user of the mobile device via a user interface of the mobile device. The transitioning may also be in response to detecting that the battery of the mobile device has a charge below a predefined threshold value, that is, the battery is low. In an embodiment, the mobile device is already in the power save mode at time T1 and therefore, first content 110 is displayed already at time T1.

The operating system of the mobile device causes the displaying of first content 110 in the power save mode display 102 in the application area 104. In an embodiment, the first content 110 may be stored to a separate power save mode display memory communicatively connected to display 100. The displaying occurs in the power save mode.

In FIG. 1 it may be assumed that the first content is a weather report, which may have been obtained from a weather provider server in response to a request from the mobile device. First content 110 comprises graphics 112 illustrating current weather and an accompanying text section 114 explaining the meaning of the graphics and a current temperature. The current temperature may be obtained from a thermometer in association with the mobile device or from a server from which other information in first content 110 may have been obtained.

At time T3, which is before the end of the first display period, a second application program executing in the operating system may form a second content 120. The mobile device may be still in the power save mode. The second application program may be a personal sports application which combines information obtained from, for example, at least one of a GNSS receiver of the mobile device, at least one accelerometer of the mobile device and a digital compass, which may rely on at least one magnetometer in the mobile device. The second application program may be a personal assistant program. The personal assistant program may provide content in response to, for example, a specific geographical area to which the mobile device enters. The personal assistant program may provide content in response to, for example, a predefined time of day. The personal assistant program may provide content in response to obtaining at least one message from a transport provider server. The message may indicate information regarding a changed schedule. The personal assistant program may provide content in response to obtaining at least one message from a public safety alert system. For example, the message may be a tsunami warning.

The personal assistant program may provide content in response to obtaining at least one message from an accommodation provider server. The personal assistant program may provide content in response to obtaining at least one message from an entertainment provider server. The personal assistant program may provide content in response to obtaining at least one message from a server associated with at least one of a sports facility, an entertainment facility, a shopping mall, an airport, a port, a railway station, a bus station and a hotel, which the user has set as a navigation target using a user interface of the mobile device. The at least one message may be used to form the second content 120.

The at least one accelerometer may comprise, for example, two two-axis accelerometers or a single three-axis accelerometer. For example, a digital accelerometer may produce a Pulse Width Modulation (PWM) output signal. The output signal may be in the form of a square wave having a certain frequency. The amount of time the voltage of the output signal is high, that is, above a predefined voltage, is proportional to the amount of acceleration. From the amount of time the operating system obtains acceleration in a specific dimension. The operating system may communicate acceleration data gathered as a time series in each of the three dimensions via a device driver of the at least one accelerometer to a pedometer application. The pedometer application determines steps from the time series of the acceleration data. The second application program determines the distance walked, for example, from a time series formed from GNSS receiver reports obtained to the second application program from a device driver of the GNSS receiver. The second application may provide a request message to a map server, the request message comprising at least current geographic coordinates obtained from the GNSS receiver. The map server provides in response to the request message a map fragment 122 to the mobile device comprising the current geographic coordinates of the mobile device. The second application alters the map fragment by plotting thereon a path 126 walked by the user of the mobile device and by adding a symbol 124 representing the current geographic coordinates of the mobile device. The path is obtained from a time series of latest geographic coordinates from the GNSS receiver. The response from the map server may also comprise a street address 128 corresponding to the current geographic coordinates.

Thereupon, the second application program may request a displaying of the second content 120 for a second display time period in application area 104 of power save mode display 102 from the operating system of the mobile device. The request may comprise a second display period for presenting the first content during the power save mode. The second display period may be shorter than the first display period. The duration of the second display period may range, for example, from 3 seconds to 10 minutes. The mobile device may be still in the power save mode.

In response to the displaying request from the second application program, operating system determines whether the requesting application is registered as the secondary content producer. The secondary content producer has a higher display priority which means that an application program registered as the secondary content producer may temporarily replace the first content 110 with the second content 120. The operating system may store second content 120 to a memory of the mobile device from which it is displayed in the power save mode display 102. In an embodiment, there is a separate power save mode display memory (not shown) communicatively connected to display 100. The second content is stored in the separate power save mode display memory in this embodiment.

In an embodiment, first content 110 or second content 120 do not completely fill the power save mode display memory. The power save mode display memory may also comprise memory for system area 106 and may also comprise memory for a background image. In an embodiment first content 110 and second content 120 are stored in power save mode display memory so that they are rendered by a graphics processor or another processor of the mobile device on the background image in the power save mode display memory. Thereby, first content 110 and second content 120 may appear on the background image in power save mode display 102. The mobile device may be still in the power save mode.

Thereupon, second content 120 is displayed on in application area 104 of the power save mode display 102, using the information of second content 120 stored in the memory of the mobile device.

At time T4 the second display time period ends and the displaying of second content 120 is stopped by operating system. This may comprise the storing of first content 110 to a memory of the mobile device from which it is displayed in power save mode display 102. First content 110 thus replaces second content in application area 104 of power save mode display 102. The mobile device may be still in the power save mode At time T5, which is still before the end of the first display period, the second application program forms a further content (not shown) to be displayed in application area 104 of power save mode display 102. The mobile device may be still in the power save mode.

The second application program requests a displaying of the further content for the second display time period in application area 104 of power save mode display 102 from the operating system of the mobile device. The request may comprise the second display period for presenting the first content during the power save mode. The second display period may be shorter than the first display period.

At time T6 the second display time period ends and the displaying of the further content is stopped by operating system. This may comprise the storing of first content 110 to the memory of the mobile device from which it is displayed in power save mode display 102. First content 110 thus replaces the further message in application area 104 of power save mode display 102. The mobile device may be still in the power save mode.

Thereupon, the first display time period may end and the displaying of first content 110 is stopped by operating system.

A benefit of allowing the displaying of second content 120 and the further content during the first display time period is that the user does not need bring the mobile device out of power save mode in order to obtain messages produced by the second application program. This improves the usability of the mobile device. If the mobile device is not frequently brought out of the power save mode to check messages provided by the second application program also reduced battery consumption may be achieved in the mobile device.

Figure 5:
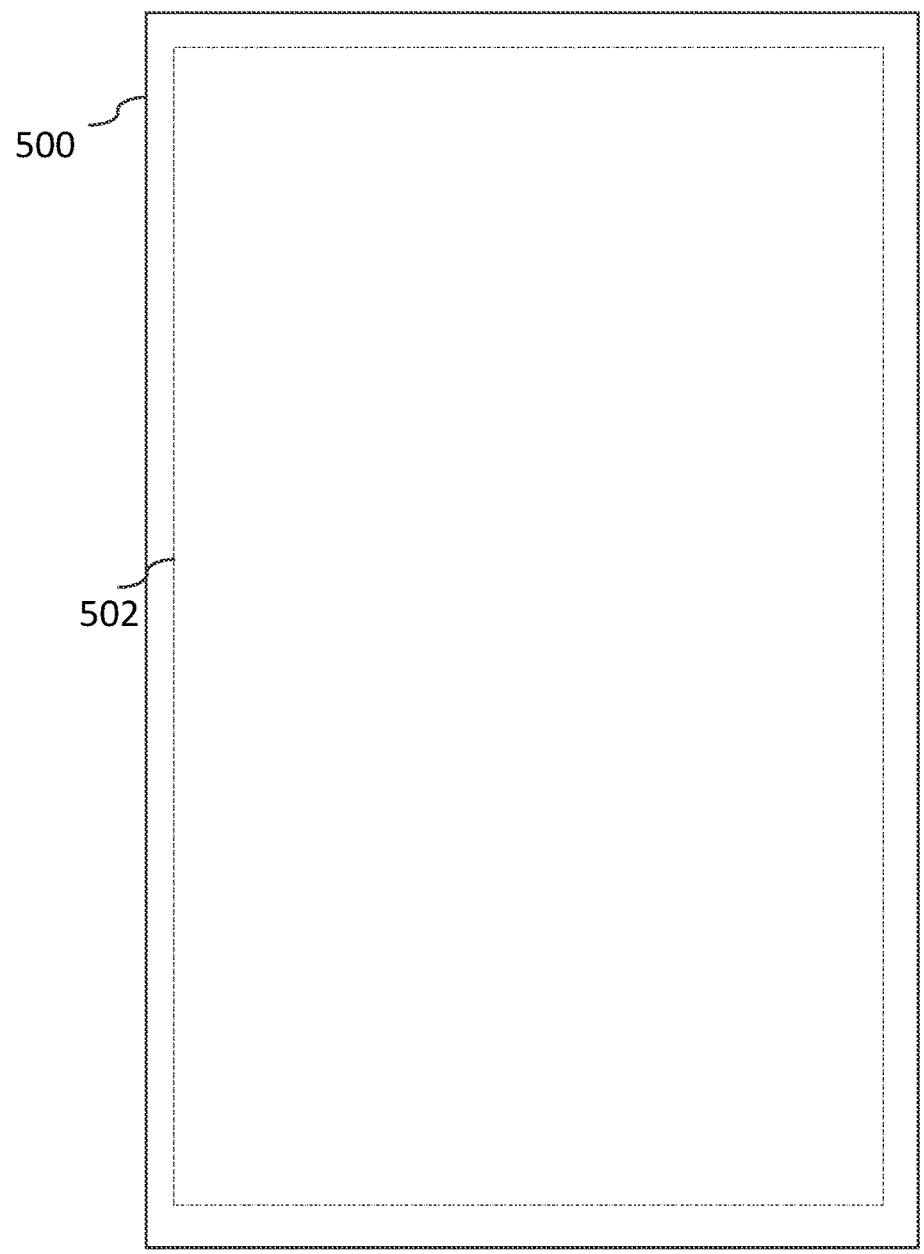
FIG. 5 illustrates a power save mode display of a mobile device in an embodiment. Like reference numerals are used to designate like parts in the accompanying drawings.

The power save mode display may not necessarily be divided on the display of the mobile device in the same manner as in FIG. 1. FIG. 5 illustrates displaying a power save mode display 502 within a display 500 of a mobile device (not shown). In FIG. 5 the power save mode display area within display 500 is not divided and, therefore, there is a single power save mode display. Power save mode display area 502 may comprise the entire display area of display 500.

Figure 2:
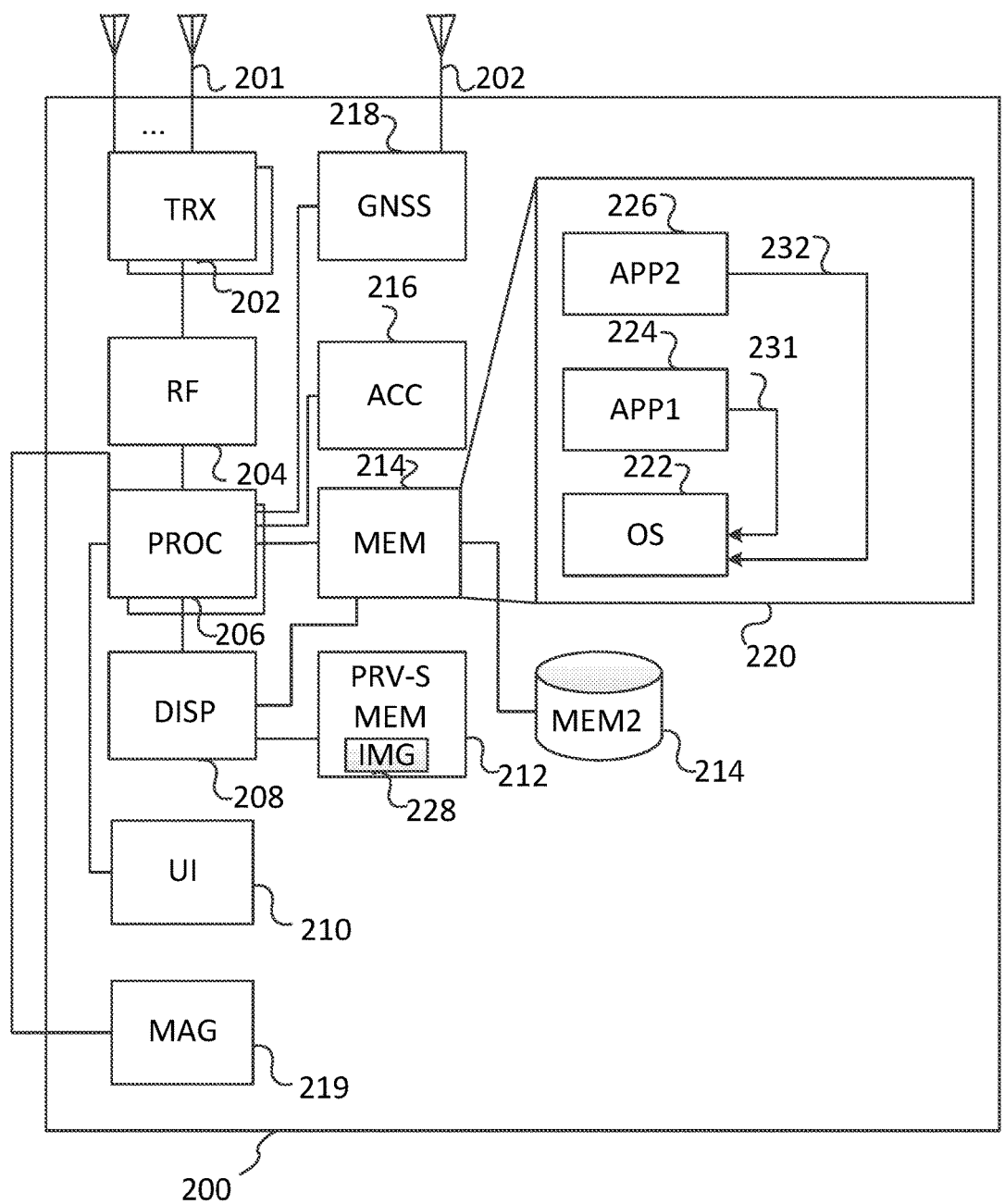
FIG. 2 is a schematic diagram of an embodiment of a mobile device.

FIG. 2 is a schematic diagram of an embodiment of a mobile device 200 in an embodiment. The schematic diagram illustrates internal structure of mobile device 200.

Mobile device 200 comprises at least one antenna 201. The at least one antenna 201 is connected to at least one Transmitter/Receiver (TRX) 202. The at least one transmitter/receiver 202 is communicatively connected to a Radio Frequency processor or circuit 204. RF processor 204 may perform, for example, interleaving, pre-coding, modulation/demodulation, Discrete Fourier Transformation (DFT) spreading, sub-carrier mapping, Inverse Fast Fourier Transformation (IFFT), cyclic prefix addition and parallel-serial conversion. The tasks performed by RF processor 204 be performed in order to allow the mobile device 200 to communicate over a wide variety of different radio technologies such as, but not limited to, Orthogonal Frequency Division Multiple Access (OFDMA), Orthogonal Frequency Division Multiplexing (OFDM), Single-Carrier Frequency Division Multiple Access (SC-FDMA), Code Division Multiple Access (CDMA), Wideband Code Division Multiple Access (WCDMA), Time Division Multiple Access (TDMA) and Frequency Division Multiple Access (FDMA). The radio technologies may be used in at least one of a cellular radio system, a wireless local area network system, a device-to-device communication system and an ad-hoc network system.

Mobile device 200 may communicate using, for example, Long-Term Evolution (LTE), Long-Term Evolution Advanced (LTE-A), UMTS, EDGE, GSM and CDMA2000 radio technologies.

RF processor 204 is communicatively connected to at least one processor 206. The at least one processor may comprise multiple cores. The at least one processor 206 is communicatively connected to a primary memory 214 which may be a Random Access Memory (RAM). Primary memory 214 may comprise, for example, static RAM (SRAM), dynamic RAM (DRAM) or magnetic RAM (MRAM). Primary memory 214 may be a volatile memory. Primary memory 214 is communicatively connected to a secondary memory 216 which may be a non-volatile memory. Secondary memory 216 may be an electrically erasable programmable read-only memory EEPROM, a Flash memory, a holographic memory or a Magnetoresistive RAM (MRAM). Secondary memory 216 may also comprise a magnetic or an optic or a magneto-optic disk. Secondary memory 216 may also comprise at least one hard-disk drive. Secondary memory 216 may store an operation system 222 of mobile device 200. Secondary memory 216 may also store executable images of a first application program 224 and a second application program 226. The executable images comprise program code.

Mobile device 200 also comprises a display controller 208 which is communicatively connected to the at least one processor 206. Display controller 208 may be responsible for receiving digital data to be displayed and providing a plurality of pixel signals to a display matrix. The display matrix may be an active-matrix or a passive-matrix. Display controller 208 may be communicatively connected to a power save mode display memory 212. The power save mode display memory 212 may be used to store a background image 228 over which messages to be displayed in a power save mode display are displayed. Display controller 208 may display on a display of (not shown) the mobile device 200 a power save mode display which comprises an area of the display of the mobile device 200 in normal mode of operation. The area may be referred to as a power save mode display.

Display controller may obtain information to be displayed from the power save mode display memory when the mobile device is in the power save mode. Mobile device 200 comprises a user interface controller 210 which is communicatively connected to the at least one processor 206. User interface controller 210 may control a touch screen, for example, by receiving signals from a touch sensitive layer (not shown) of a display (not shown) of the mobile device 200. Mobile device 200 also comprises a Global Navigation Satellite System (GNSS) receiver 218 communicatively connected with the at least one processor 206. The GNSS receiver is connected to at least one GNSS antenna 202. The GNSS may be, for example, one of GPS, GLONASS, Galileo or Beidou. Mobile device 200 also comprises at least one accelerometer 216 which is communicatively connected to the at least one processor 206. Mobile device may comprise also at least one magnetometer 219 communicatively connected to the at least one processor 206.

The communicative connections between the at least one processor 206 and RF processor 204, display controller 208, user interface controller 210 and memory 214 may be arranged, for example, using at least one message bus.

The content of memory 214 when mobile device 200 is powered-on is illustrated with box 220. Memory 214 stores operating system 222, which may comprise an operating system kernel, device drivers for communicating with display controller 208, user interface controller 210, RF processor 204, GNSS receiver 218 and the at least one accelerometer 216. Operating system 222 comprises a scheduler which schedules a plurality of processes or threads for execution by operating system 222. The processes or threads are instances of application programs executed by operating system 222. The processor may comprise a memory code segment, a data segment and a stack segment. The code segment may be shared between instances of same application program. The part of the data segment not containing application program instance specific data may be shared between the instances.

In FIG. 2, a first application program 224 and a second application program 226 are examples of processes or threads executed by operating system 222. In an embodiment, first application program 224 and a second application program 226 may also be threads executed by a virtual machine (not shown) executed by operating system 222. First application program 224 and second application program 226 may correspond to the first application program and the second application program explained in association with FIG. 1, respectively. First application program 224 and second application program 226 are programmed to display content in a power save mode display of mobile device 200. First application program 224 may be selected by the user of mobile device 200 via a user interface of the mobile device as a primary content producer to display content in the power save mode display. Second application program 226 may be selected by the user of mobile device 200 via the user interface of the mobile device as a secondary content producer to display content in the power save mode display. This means that content of the second application program 226 is displayed in the power save mode display instead of content of the first application program 224 always when there is content requested for display from the second application program 226. The content from the second application program 226 may be displayed a shorter time period than content from the first application program 224 in the power save mode display.

In an embodiment, operating system 222 executes first application program 224. First application program 224 produces a first content 231 during the execution. Operating system 222 executes also second application program 226. Mobile device 200 may be in the power save mode.

First application program 224 requests a displaying of first content 231 in the power save mode display for a first display time period. The power save mode display comprises a predefined area of a normal mode display of mobile device 200. Operating system 200 displays first content 231 in the power save mode display, if the mobile device 200 is in the power save mode. The displaying of first content 231 may be delayed until mobile device 200 performs a transition from the normal mode to a power save mode, in case first application program 224 requests a displaying of first content 231 while mobile device 200 is in the normal operating mode. Mobile device 200 may already be in power save mode when first application program 224 requests a displaying of first content 231.

While a time has passed in the power save mode, second application program 226 produces a second content. Second application program 226 requests from operating system 222 a displaying of second content 231 in the power save mode display for a second display time period. The requesting of displaying of second content 231 occurs before the expiring of the first display time.

In response to the request, operating system 222 determines whether the requesting application program has previously been selected as the secondary content producer by the user. If the requesting application program is the secondary content producer, operating system causes displaying of second content 231 in the power save mode display.

In an embodiment, the designation of second application program 226 as secondary content producer affects whether second application program 226 is allowed to interrupt the presenting of first content 231 in the power save mode display and to have the second content 232 displayed instead for a time period.

Figure 3:
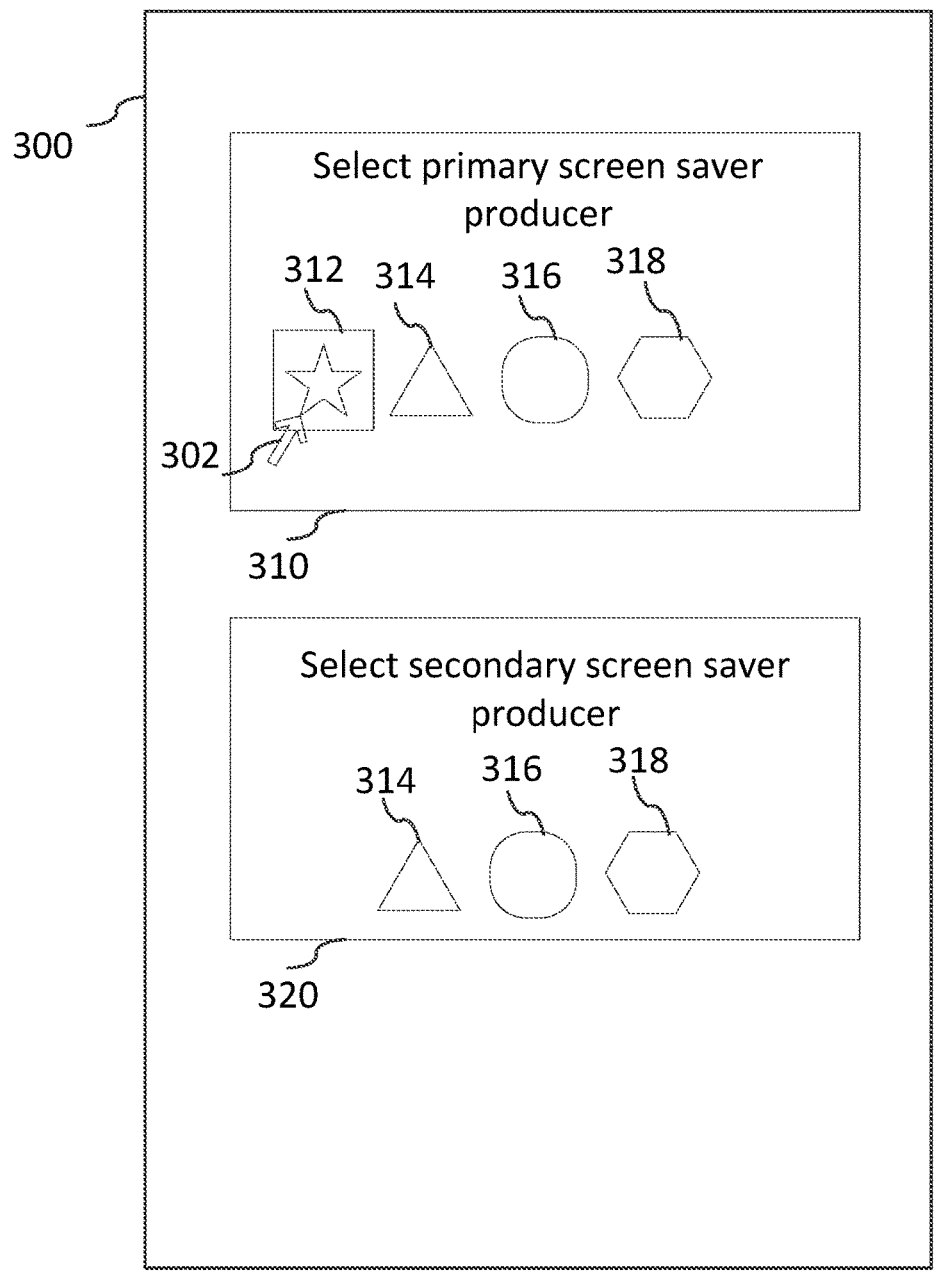
FIG. 3 illustrates an example of a user interface for defining application display priorities in an embodiment.

FIG. 3 illustrates an example of a user interface for designating applications as the primary content producer or the secondary content producer in an embodiment. In FIG. 3 there is illustrated a graphical user interface 300 of a mobile device such as mobile device 200 or mobile device 100 described in association with FIGS. 1 and 2. The graphical user interface 300 comprises a window 310 that enables a user of the mobile device to select an application program as a primary content producer, which produces the default content displayed in a power save mode display. In FIG. 3 there are illustrated application programs 312, 314, 316 and 318 which are represented by icons in window 310. The user may select using a pointer tool, which is represented as an arrow symbol 302 indicating current position of the pointer tool on graphical user interface 300, any of the illustrated application programs 312, 314, 316 and 318 as the primary content producer. In FIG. 3 it is assumed that the user selects application program 312.

The graphical user interface 300 also comprises a window 320 that enables a user of the mobile device to select using pointer tool 302 an application program as a secondary content producer, which is an application program that may produce second content that may override the first content illustrated in the power save mode display and thus be displayed instead of the first content for a time period which is shorter than the time period that the first content is presented. In FIG. 3 there are illustrated application programs 314, 316 and 318 which are represented by icons in window 320. Application program 312 is removed from window 320 following the selection of application program 312 as the primary content producer. Thereupon, the user is allowed to select one of application programs 314, 316 and 318 as the secondary content producer.

In an embodiment the first content is displayed in application area 104 of FIG. 1. The first content may be overridden by the secondary content producer. In an embodiment, primary content producer is the first application explained in association with FIGS. 1 and 2. In an embodiment, the secondary content producer is the second application explained in association with FIGS. 1 and 2.

In an embodiment, applications listed as icons in windows 310 may be indicated with application names in a list. The list may be an item list where application names are listed one per row.

In an embodiment, instead of windows 310 and 320 applications may be presented in a drop-down menu.

In an embodiment, instead of windows 310 and 320 applications may be presented in a text menu.

In an embodiment, pointer tool 302 on graphical user interface 300 may be moved with a mouse, a mini-joystick, a touch-sensitive display, a movement of arm or finger or head as detected by a camera of the mobile device.

In an embodiment, each application adapted to act as a content producer application to display content in the power save mode display is provided with, for example, selectable icons, menu items, symbols or buttons, as part of the user interface of the application in question, that may be used by the user to designate the application as the primary content producer and/or the secondary content producer for the power save mode display.

The designation may comprise that the application requests that the operating system of mobile device to sets the application as either the primary content producer or the secondary content producer based on which option the user selected.

Figure 4:
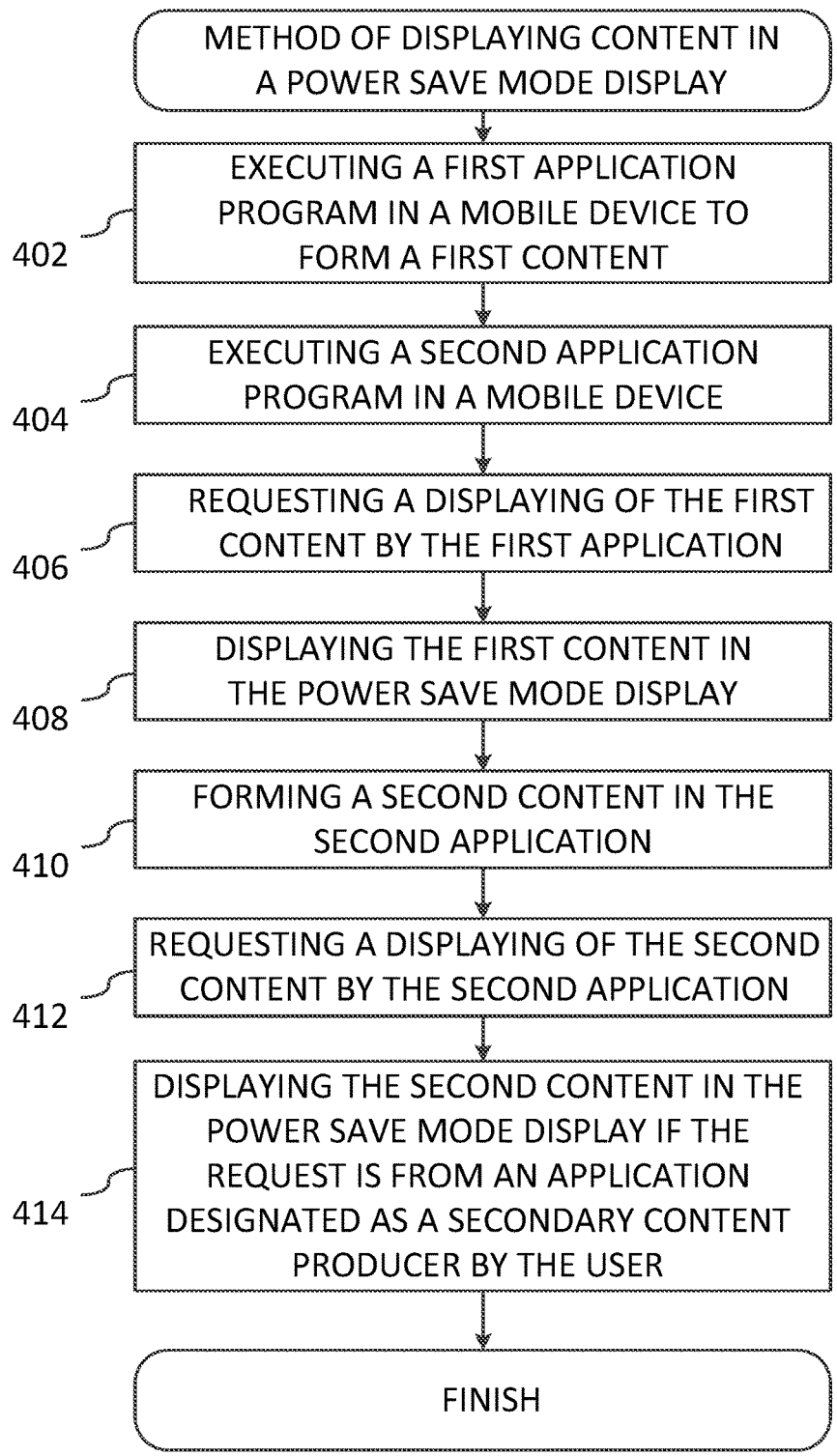
FIG. 4 is a flowchart illustrating displaying two contents during a power save mode in an embodiment.

FIG. 4 is a flowchart illustrating displaying two contents with different display priorities during a power save mode in an embodiment.

At step 402 the mobile device executes a first application program. The first application program produces a first content during the execution. The first application program may be a user controllable application program selected by a user of the mobile device as a primary content producer for a power save mode display, which is used when the mobile device is in a power save mode. At step 402 the mobile device may be in the power save mode.

At step 404 the mobile device executes a second application program. The second application program produces a second content during the execution. The second application program may be a user controllable application program.

At step 406 the first application program requests from the mobile device a displaying of the first content in a power save mode display for a first display time period. The first application program may request the displaying of the first content in the power save mode display from the operating system of the mobile device. The first application program may provide the first display time period to the operating system. The providing may be performed as part of the displaying request. The power save mode display may comprise a predefined area of a normal mode display of the mobile device. The power save mode display may be divided to two areas: an area for displaying time and/or date and an application area for displaying messages from the first application or the second application. The displaying may be requested by the first application from the operating system of the mobile device. The first application program may request the displaying of the first content before the mobile device transitions to the power save mode from a normal operating mode. The requesting may be performed also when the mobile device is already in the power save mode.

At step 408 the mobile device displays the first content in the power save mode display.

At step 410 the second application program forms the second content.

At step 412 the second application program requests from the mobile device a displaying of the second content in the power save mode display for a second display time period. The displaying may be requested by the second application program from the operating system of the mobile device. The mobile device may determine whether the second application program is defined by the user as a secondary content producer for the power save mode display. The secondary content producer is an application program that may produce second content which overrides the displaying of the first content from the first application program. The second content is displayed instead of the first content in the power save mode display. The determination is performed in response to the requesting of the displaying of the second content in the power save mode display.

At step 414 the mobile device displays the second content in the power save mode display instead of the first content for the second display time period. The second display time period may be shorter that the first display time period. Following the second display time period the first content may be displayed again in the power save mode display.

In an embodiment, the primary content producer is an application program that produces content to be displayed in the power save mode display for the entire time that the mobile device is in the power save mode. The content produced from the primary content producer application may vary during the power save mode time.

In an embodiment, the secondary content producer is an application program that produces content to be displayed in the power save mode display for time periods shorter than the entire time that the mobile device is in the power save mode. The content from the secondary content producer is removed by the mobile device before the mobile device returns to normal operating mode.

Thereupon, the method may be finished. In an embodiment, the method steps may be executed in the numeric order of the reference numerals.

There is presented a method in a mobile device comprising: a display comprising a normal operating mode and a power save mode, and a memory comprising a first application program. The method comprises: when the mobile device is in the power save mode and the first application program is running, displaying a first content relating to the first application program on the display, the display being in the power save mode when the first content is displayed, the first content being displayed for a first determined time period or until the mobile device transitions from the power save mode to the normal operating mode, the first determined time period being specified by the first application program.

There is presented a method in a mobile device comprising: a display comprising a normal operating mode and a power save mode, and a memory comprising a first application program and a second application program. The method comprises: when the mobile device is in the power save mode and the first application program is running, displaying a first content relating to the first application program on the display, the display being in the power save mode when the first content is displayed, the displaying being requested by the first application program from the mobile device for a first determined time period; executing the second application program at least during the first determined time period; when the mobile device is in the power save mode and prior to end of the first determined time period, requesting from the mobile device a displaying of a second content on the display by the second application program, the display being in the power save mode; and displaying the second content related to the second application program on the display, the display being in the power save mode, in response to determining, by the mobile device, whether the second application program may override the first application program to display the second content on the display instead of the first content.

There is presented a mobile device comprising: a display comprising a normal operating mode and a power save mode; a memory comprising an application program; at least one processor and a memory storing instructions that, when executed, cause the mobile device, when the mobile device is in the power save mode and the application program is running, to display content relating to the application program on the display, the display being in the power save mode, the content being displayed for a first determined time period or until the mobile device transitions from the power save mode to the normal operating mode, the first determined time period being specified by the first application program.

There is presented a computer program stored on a non-transitory computer readable medium, the computer program comprising code adapted to cause the following when executed on a data-processing system: when the mobile device is in the power save mode and an application program is running, displaying content relating to an application program on a display of the mobile device, the display and the mobile device comprising a normal operating mode and a power save mode, the content being displayed when the display is in the power save mode, the content being displayed for a first determined time period or until the mobile device transitions from the power save mode to the normal operating mode, the first determined time period being specified by the first application program.

In an embodiment, the display in the power save mode comprises an area for use during power save mode operation of the mobile device, the area being a portion of a full display area.

In an embodiment, the method further comprises: receiving via a user interface of the mobile device, a selection that content of the first application program is to be displayed on the display, the displaying occurring when the mobile device is in the power save mode and the display is in the power save mode.

In an embodiment, capability of the first application program to display content on the display, when the display is in the power save mode, is verified by an operating system of the mobile device.

In an embodiment, the verification is performed prior to allowing the selection via the user interface of the mobile device.

In an embodiment, the verification is performed using metadata associated with the first application program in the memory of the mobile device, the metadata comprises at least one parameter that indicates that the first application program is programmed to display content on the display, when the display is in the power save mode.

In an embodiment, the selection of the first application program to display content on the display, when the display is in the power save mode, is performed by selecting a user interface option provided in the first application program.

In an embodiment, the method further comprises: receiving via a user interface of the mobile device, a selection that content of a second application program is to be displayed on the display, when the display is in the power save mode, in addition to content of the first application program, the displaying occurring when the mobile device is in the power save mode; producing in the second application program a second content; and when the mobile device is in the power save mode, the display is in the power save mode and the second application program is running, displaying the second content on the display which replaces the first content on the display for the duration of a second determined time period, the second determined time period being shorter than the first determined time period.

In an embodiment, the method comprises: producing in the second application program a sequence of contents; and when the mobile device is in the power save mode, the display is in the power save mode, and the second application program is running, displaying the sequence of contents on the display, the sequence of contents replacing the first content on the display for the duration of displaying of the sequence, each content in the sequence of contents having a predefined minimum display time.

In an embodiment, the second application program comprises at least one of a navigation application, a pedometer application, a pulse meter application and a messaging application.

In an embodiment, a transition from the normal operating mode to the power save mode is performed in response to at least one of detecting of a predefined time period without user input via a user interface of the mobile device, receiving a transition request via the user interface of the mobile device and detecting that the battery of the mobile device is low.

In an embodiment, the first application program comprises at least one of a news provider application, a weather provider application and a calendar application.

In an embodiment, pixels on the display, when the display is in the power save mode, are set using information obtained from a power save mode display memory which is powered during the power save mode of the mobile device while at least one other memory of the mobile device is switched off at the transition of the mobile device from the normal mode to the power save mode, the power save mode display memory comprising the first content.

In an embodiment, the power save mode display memory is used to store a background image.

In an embodiment, the first content is displayed on the background image on the display of the mobile device.

In an embodiment, in the power save mode of the display, content is displayed with a diminished luminous intensity of a background light of the display compared to the normal operating mode of the display.

In an embodiment, in the power save mode of the display, the display has a lower refresh frequency and lower bit depth compared to the normal operating mode of the display.

In an embodiment, the non-transitory computer readable medium comprises at least one of a static random access memory, a read-only memory, a mask read-only memory, a non-volatile random-access memory, an electrically erasable programmable read-only memory, a flash memory, a magnetic or optic disk, a removable memory module, a removable memory card and a Magnetoresistive random access memory.

In an embodiment, the mobile device comprises at least one of a cellular phone, a portable audio player device, a portable video player device, a tablet computer, a palmtop computer and a laptop computer. The mobile device may communicate using a radio interface that comprises a cellular radio network, a wireless local area network and an ad-hoc network.

In an embodiment, the area for use during power save mode operation of the mobile device is divided in two areas, a first area displaying information provided by an operating system of the mobile device and a second area displaying the first content or the second content.

In an embodiment, the area for use during power save mode operation of the mobile device comprises a number of pixels that is lower than the normal mode display of the mobile device. The pixels in the area may be arranged as columns or rows interleaved between columns or rows, respectively, of the normal mode display.

In an embodiment, the columns or rows of the area for use during power save mode operation are changed periodically.

In an embodiment, a user controllable application comprises an application to which the user may produce content. The content may be in the form of text or at least one image.

In an embodiment, a user controllable application comprises an application that forms content from user actions recorded in the user controllable application. The user actions may comprise at least one of movement of the user as recorded by a GNSS receiver of the mobile device, user bodily movements recorded by an accelerometer of the mobile device, user interaction with the mobile device via a user interface and user health information obtained to the mobile device from at least one sensor of the mobile device or a remote sensor communicating with the mobile device.

In an embodiment, the first application program displays a third content comprising information from the first content upon the mobile device transitioning from the power save mode to the normal operating mode, the third content being displayed in the normal operating mode of the display.

In an embodiment, the first determined time period is specified by the first application program.

In an embodiment, the first application program is selected by the user and the second application program is selected by the mobile device to display content in the power save mode display.

In an embodiment, the determining, by the mobile device, whether the second application program may override the first application program to display the second content on the display instead of the first content is performed based on an evaluation that the second content is more relevant for the user than the first content. The evaluation may be performed based on information stored, for example, in the mobile device, in a personal assistant application and in a cloud application.

In an embodiment, the pixel depth indicates the number of different colors available to the display. For example, a pixel depth of 8 bits indicates 256 different colors. For example, a pixel depth of 3 bits indicates 8 colors different colors.

There presented is a method in a mobile device comprising: a display comprising a normal operating mode and a power save mode and a memory. The method in the mobile device is characterized in that the memory comprises a first application program and in that the method comprises: when the mobile device is in the power save mode and the first application program is running, displaying a first content relating to the first application program on the display, the display being in the power save mode, the content being displayed for a first determined time period or until the mobile device transitions from the power save mode to the normal operating mode, the first determined time period being specified by the first application program.

There presented is a mobile device comprising: a display comprising a normal operating mode and a power save mode; a memory; and at least one processor and a memory. The mobile device is characterized in that the memory stores an application program and in that the memory stores instructions that, when executed, cause the mobile device, when the mobile device is in the power save mode and said application program is running, to display content relating to the application program on the display, the display being in the power save mode, the content being displayed for a first determined time period or until the mobile device transitions from the power save mode to the normal operating mode, the first determined time period being specified by the first application program.

There presented is a computer program stored on a non-transitory computer readable medium, the computer program comprising code adapted to cause the following when executed on a data-processing system: displaying content on a display of a mobile device during power save mode operation of the mobile device, the display being in the power save mode, the display and the mobile device comprising a normal operating mode and a power save mode. The computer program is characterized in that the displaying of the content relates to the application executed when the mobile device is in the power save mode and the content is displayed for a first determined time period or until the mobile device transitions from the power save mode to the normal operating mode, the first determined time period being specified by the first application program.

There is presented a method in a mobile device comprising: a display comprising a normal operating mode and a power save mode, and a memory comprising a first application program and a second application program, the method comprising: executing the first application program and the second application program when the mobile device is in the power save mode. The method is characterized in that when the mobile device is in the power save mode and the first application program is running, displaying a first content relating to the first application program on the display, the display being in the power save mode when the first content is displayed, the displaying being requested by the first application program from the mobile device for a first determined time period; executing the second application program at least during the first determined time period; when the mobile device is in the power save mode and prior to end of the first determined time period, requesting from the mobile device a displaying of a second content on the display by the second application program, the display being in the power save mode; and displaying the second content related to the second application program on the display, the display being in the power save mode, in response to determining, by the mobile device, whether the second application program may override the first application program to display the second content on the display instead of the first content.

The embodiments described hereinbefore may be used in any combination with each other. Several of the embodiments may be combined together to form a further embodiment. A method, a mobile device, a computer program or a computer program product may comprise at least one of the embodiments described hereinbefore. It is to be understood that any of the above embodiments or modifications can be applied singly or in combination to the respective aspects to which they refer, unless they are explicitly stated as excluding alternatives.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the reflection control element functionality may be performed by one or more hardware logic components.

An example of the apparatus or a system described hereinbefore is a computing-based device comprising one or more processors which may be microprocessors, controllers or any other suitable type of processors for processing computer executable instructions to control the operation of the device in order to control one or more sensors, receive sensor data and use the sensor data. Platform software comprising an operating system or any other suitable platform software may be provided at the computing-based device to enable application software to be executed on the device.

The computer executable instructions may be provided using any computer-readable media that is accessible by a computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media is shown within the computing-based device it will be appreciated that the storage may be distributed or located remotely and accessed via a network or other communication link, for example by using communication interface.

The computing-based device may comprise an input/output controller arranged to output display information to a display device which may be separate from or integral to the computing-based device. The display information may provide a graphical user interface, for example, to display hand gestures tracked by the device using the sensor input or for other display purposes. The input/output controller is also arranged to receive and process input from one or more devices, such as a user input device (e.g. a mouse, keyboard, camera, microphone or other sensor). In some examples the user input device may detect voice input, user gestures or other user actions and may provide a natural user interface (NUI). This user input may be used to configure the device for a particular user. In an embodiment the display device may also act as the user input device if it is a touch sensitive display device. The input/output controller may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A hand-held mobile device comprising:
   a display operable in a normal operating mode and a power save mode;
   a battery to power at least the display;
   at least one processor; and
   a memory storing instructions that, when executed by the at least one processor, cause the hand-held mobile device to:
   when the display is in the power save mode and a first application program is running on the hand-held mobile device, display a first content relating to the first application program on the display for a first application-specified time period requested by the first application program;
   execute a second application program at least during the first application-specified time period; and
   when the display is in the power save mode and prior to an end of the first application-specified time period, responsive to receiving a request for the second application program, display a second content relating to the second application program on the display upon determining that the second application program is to override the first application program to display the second content on the display instead of the first content.

2. A method performed by a hand-held mobile device comprising:
   a display operable in a normal operating mode and a power save mode, a battery to power at least the display, and a memory storing at least a first application program and a second application program, the method comprising:
   when the display of the hand-held mobile device is in the power save mode and the first application program is running on the hand-held mobile device, displaying a first content relating to the first application program on the display for a first application-specified time period requested by the first application program;
   executing the second application program at least during the first application-specified time period;
   when the display of the hand-held mobile device is in the power save mode and prior to an end of the first application-specified time period, responsive to receiving a request for the second application program, displaying a second content relating to the second application program on the display upon determining that the second application program is to override the first application program to display the second content on the display instead of the first content.

3. A method performed by a hand-held mobile device comprising:
   a display operable in a normal operating mode and a power save mode, a battery to power at least the display, and a memory storing at least a first application program and a second application program, the method comprising:
   when the display of the hand-held mobile device is in the power save mode and the first application program is running on the hand-held mobile device, displaying a first content relating to the first application program on the display for a lesser of a first application-specified time period requested by the first application program or until the hand-held mobile device transitions from the power save mode to the normal operating mode;
   executing the second application program at least during the first application-specified time period; and
   when the display of the hand-held mobile device is in the power save mode and prior to an end of the first application-specified time period, responsive to receiving a request for the second application program, displaying a second content relating to the second application program on the display upon determining that the second application program is to override the first application program to display the second content on the display instead of the first content.

4. The method according to claim 3, wherein the display in the power save mode comprises a limited display area for use during the power save mode for display of the first content or the second content, the limited display area being a portion of a full display area of the display.

5. The method according to claim 3, the method further comprising:
   receiving via a user interface of the hand-held mobile device, a selection that the first content relating to the first application program is to be displayed on the display, a request for the first application program being responsive to the selection via the user interface.

6. The method according to claim 5, wherein a capability of the first application program to display the first content on the display, when the display is in the power save mode, is verified by an operating system of the hand-held mobile device.

7. The method according to claim 6, wherein the operating system verifies the capability prior to allowing the selection via the user interface of the hand-held mobile device.

8. The method according to claim 6, wherein the operating system verifies the capability using metadata associated with the first application program in the memory of the hand-held mobile device, and the metadata comprises at least one parameter that indicates that the first application program is programmed to display content on the display, when the display is in the power save mode.

9. The method according to claim 5, wherein the selection is performed by selecting a user interface option provided in the first application program.

10. The method according to claim 3, the method further comprising:
receiving via a user interface of the hand-held mobile device, a selection that the second content of the second application program is to be displayed on the display, the request for the second application program being responsive to the selection via the user interface;
wherein displaying the second content on the display replaces the first content on the display for the duration of a second time period that is shorter than the first application-specified time period.

11. The method according to claim 10,
wherein the second application program produces a sequence of contents, including at least the second content; and
the method further comprising:
when the display is in the power save mode, and the second application program is running, displaying the sequence of contents on the display, the sequence of contents replacing the first content on the display for the duration of displaying of the sequence, each content in the sequence of contents having a predefined minimum display time.

12. The method according to claim 10, wherein the second application program comprises at least one of a navigation application, a pedometer application, a pulse meter application and a messaging application.

13. The method according to claim 3, wherein a transition from the normal operating mode to the power save mode is performed in response to at least one of detecting of a predefined time period without user input via a user interface of the hand-held mobile device, receiving a transition request via the user interface of the hand-held mobile device and detecting that the battery of the hand-held mobile device is low.

14. The method according to claim 3, wherein pixels on the display, when the display is in the power save mode, are set using information obtained from a power save mode display memory which is powered during the power save mode of the hand-held mobile device while at least one other memory of the hand-held mobile device is switched off at a transition of the display of the hand-held mobile device from the normal mode to the power save mode, the power save mode display memory comprising the first content.

15. The method according to claim 14, wherein the power save mode display memory is used to store a background image.

16. The method according to claim 15, wherein the first content is displayed on the background image on the display of the hand-held mobile device.

17. The method according to claim 3, wherein the first application program comprises at least one of a news provider application, a weather provider application, and a calendar application.

18. The method according to claim 3, wherein in the power save mode of the display, at least the first content is displayed with a diminished luminous intensity of a background light of the display compared to the normal operating mode of the display.

19. The method according to claim 3, wherein in the power save mode of the display, the display has a lower refresh frequency and lower bit depth compared to the normal operating mode of the display.

* * * * *